E. A. GRAHAM.
TELEPHONIC APPARATUS.
APPLICATION FILED OCT. 7, 1907.

928,862.

Patented July 20, 1909.
11 SHEETS—SHEET 3.

E. A. GRAHAM.
TELEPHONIC APPARATUS.
APPLICATION FILED OCT. 7, 1907.

928,862.

Patented July 20, 1909.
11 SHEETS—SHEET 4.

Witnesses.
E. R. Peck
C. P. Wright Jr.

Inventor:
Edward A. Graham
per Hubert Peck atty

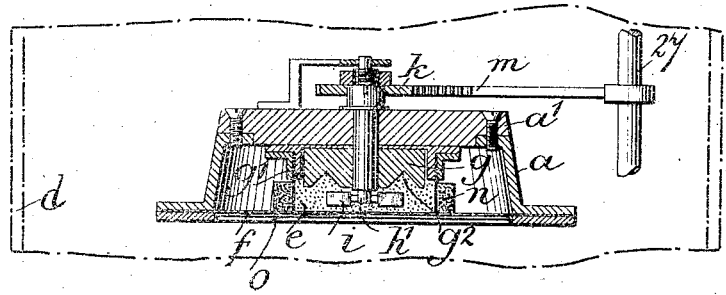
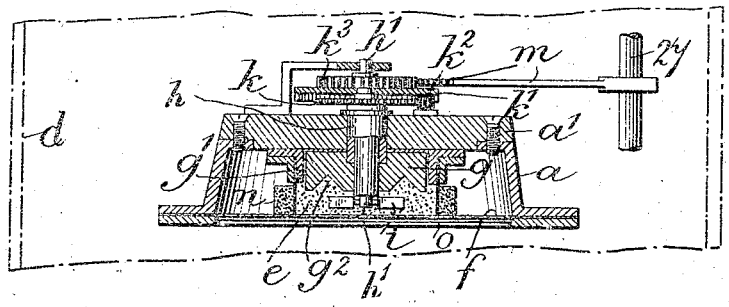
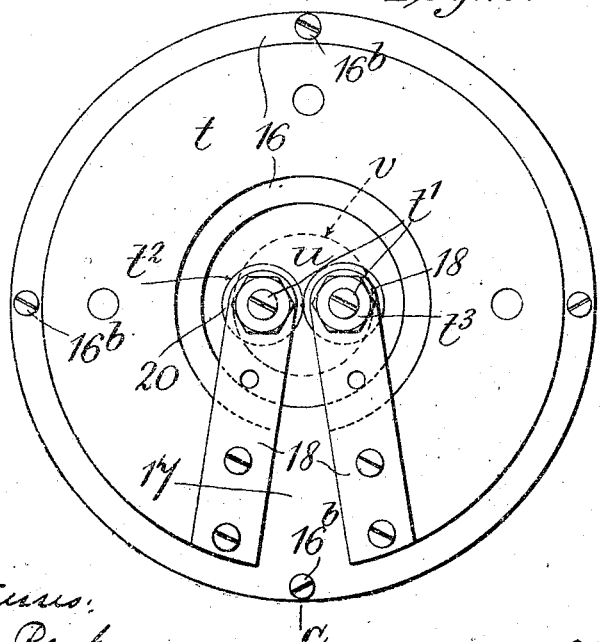
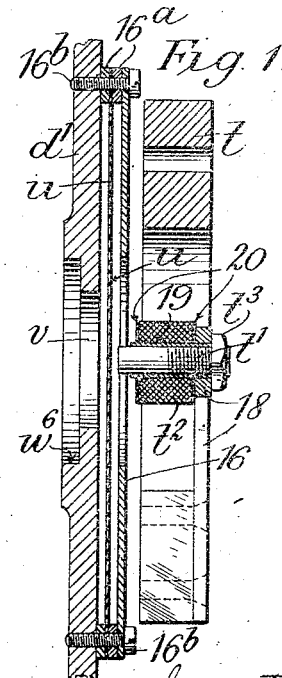

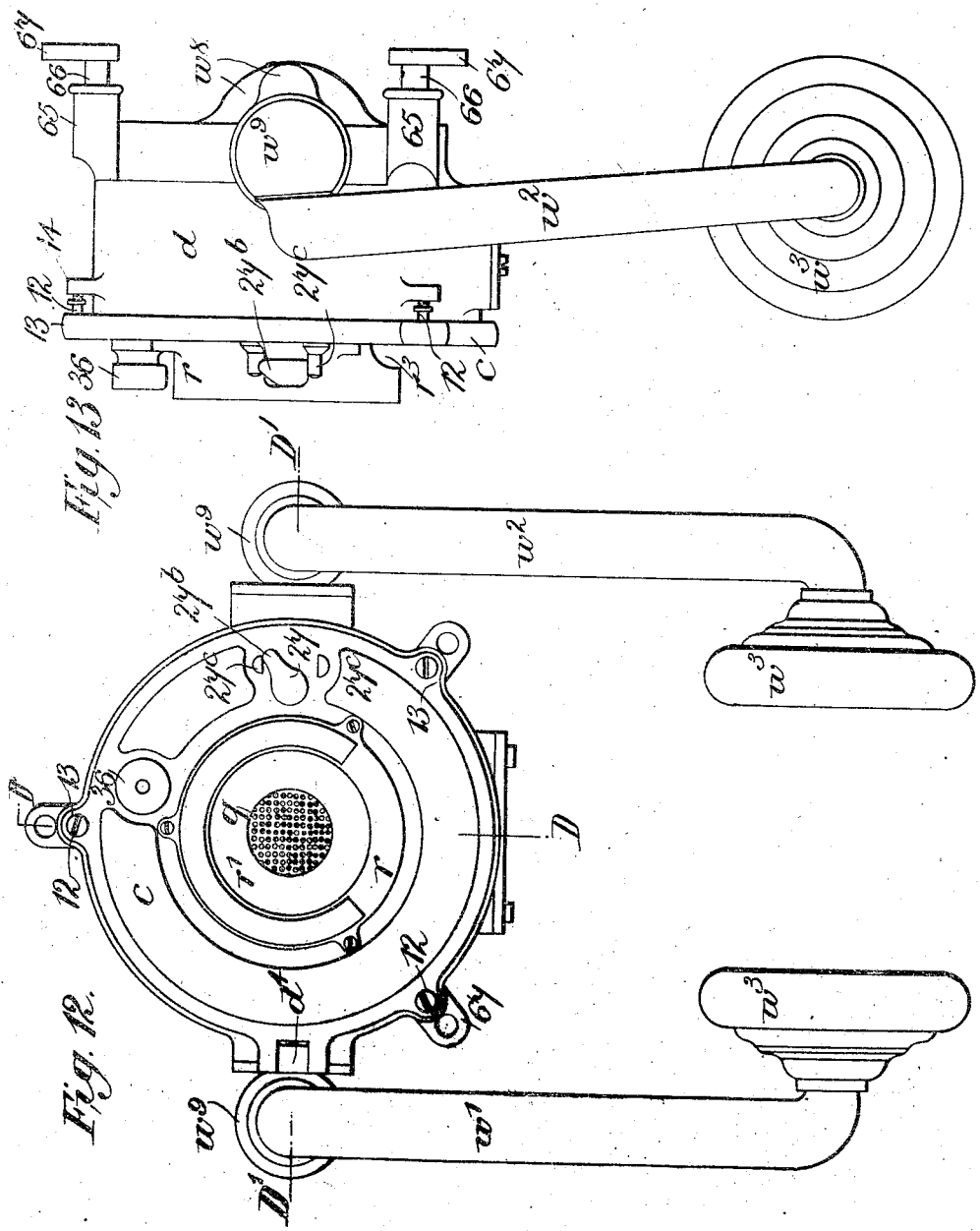

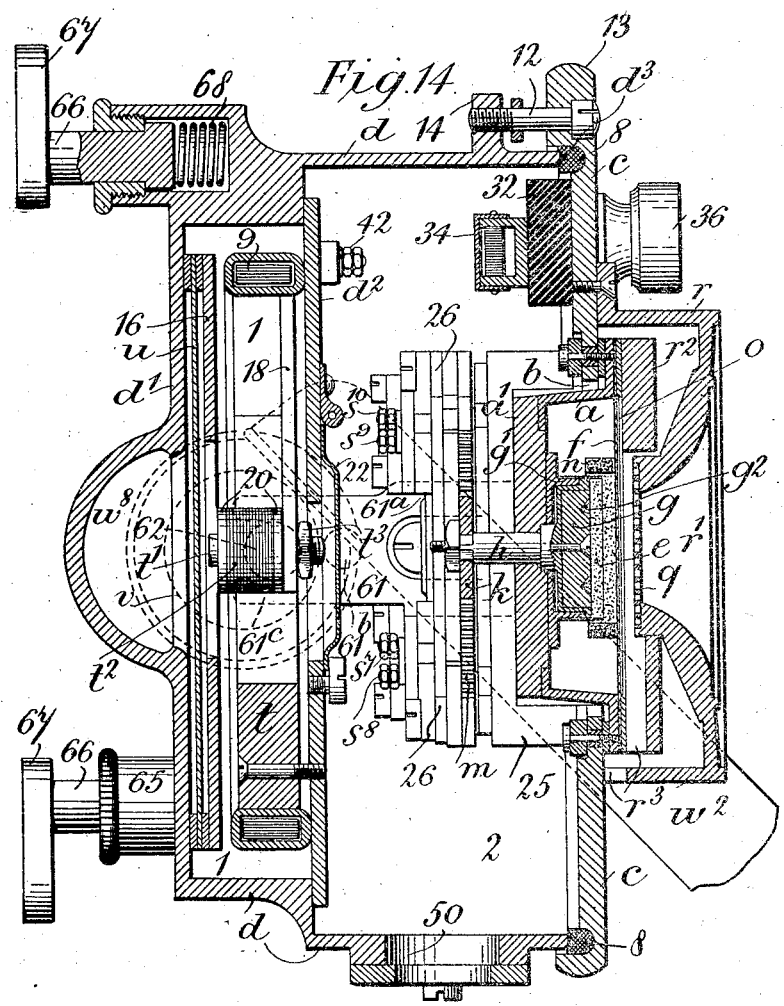

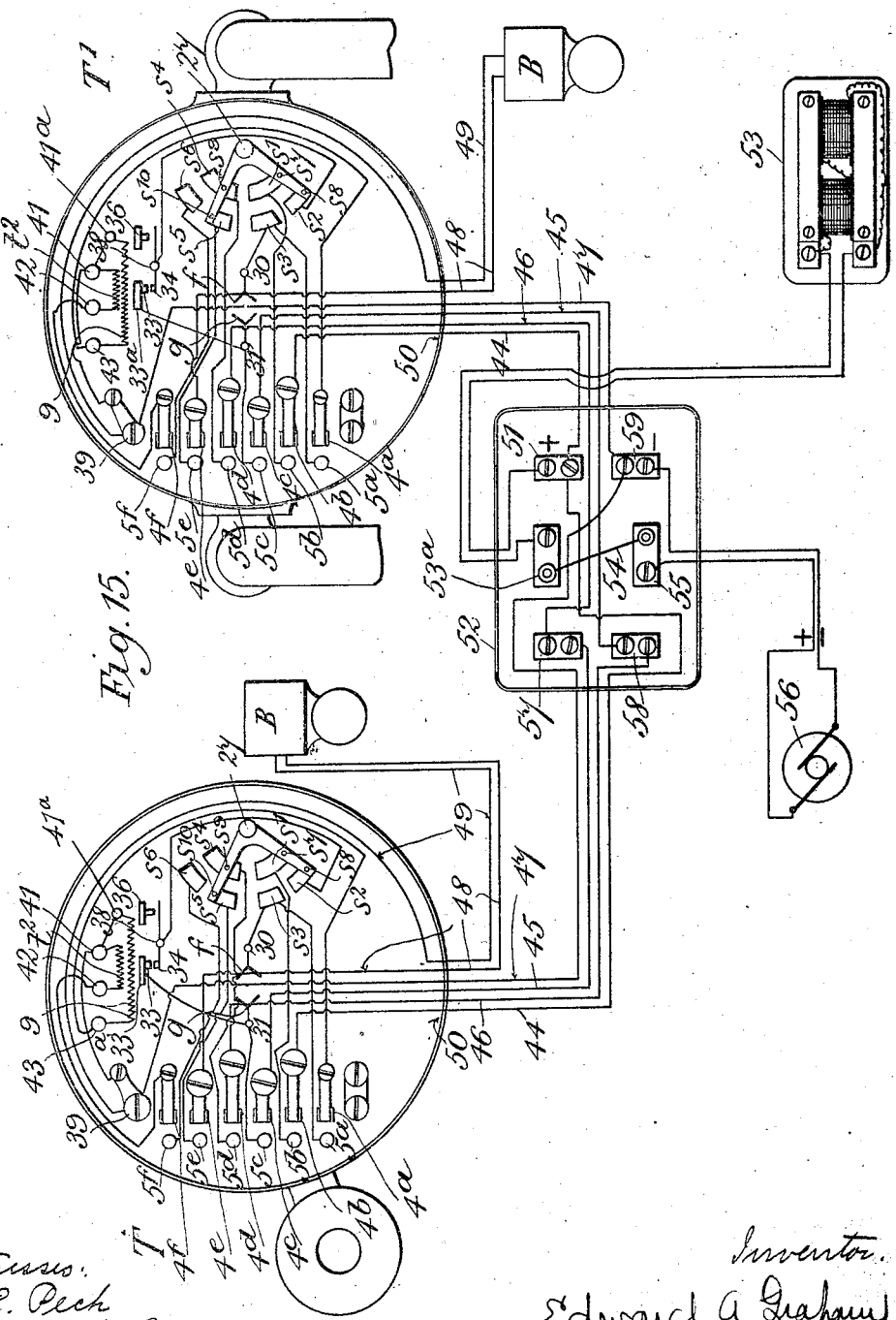

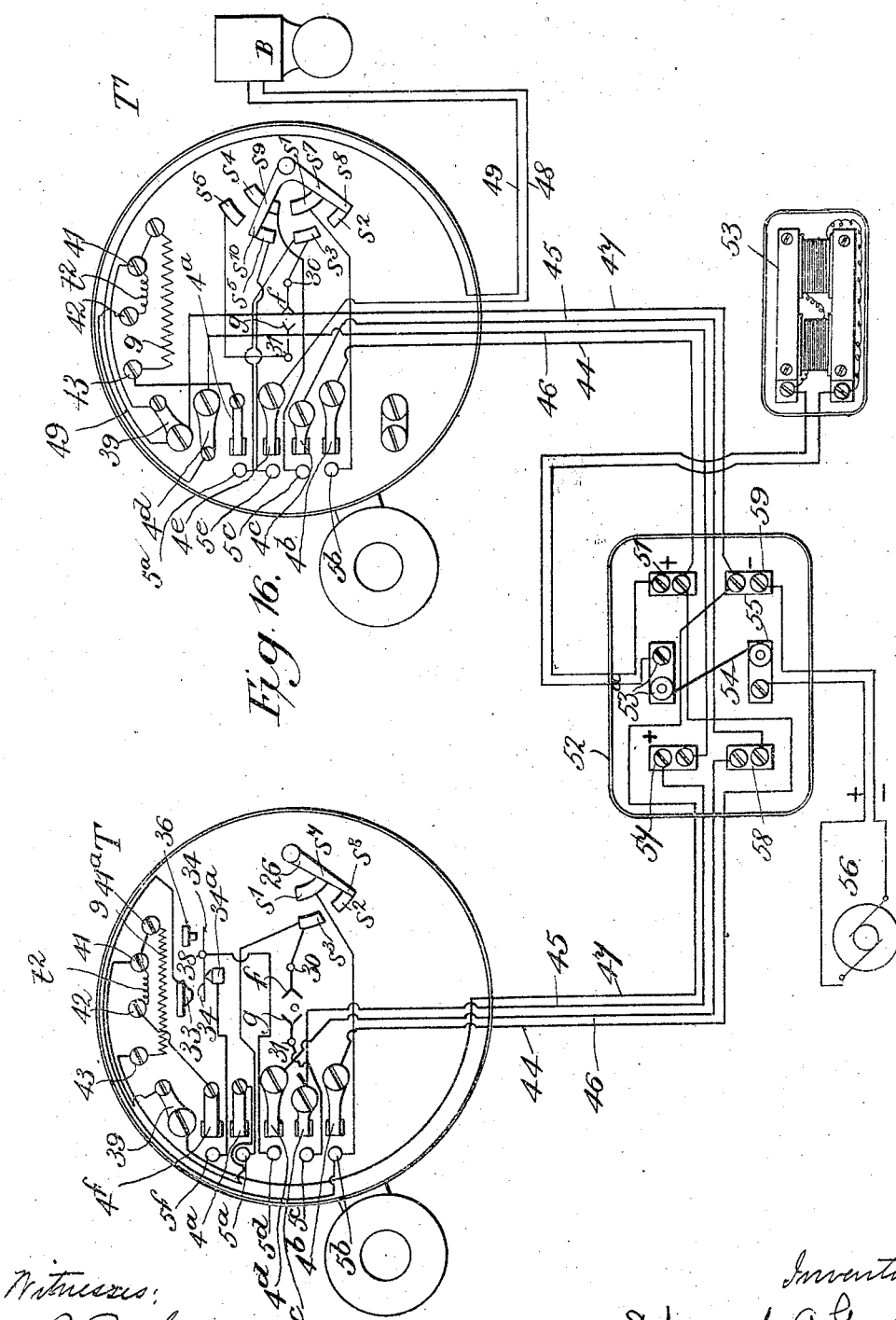

UNITED STATES PATENT OFFICE.

EDWARD ALFRED GRAHAM, OF BROCKLEY, LONDON, ENGLAND, ASSIGNOR TO HIMSELF AND ALFRED GRAHAM & CO., OF BROCKLEY, ENGLAND.

TELEPHONIC APPARATUS.

No. 928,862.   Specification of Letters Patent.   Patented July 20, 1909.

Application filed October 7, 1907. Serial No. 396,276.

*To all whom it may concern:*

Be it known that I, EDWARD ALFRED GRAHAM, a subject of the King of Great Britain and Ireland, residing at Brockley, in the county of London, England, have invented Improvements in Telephonic Apparatus, of which the following is a specification.

This invention has reference to improvements in telephonic apparatus of the kind in which the telephonic transmitter and receiver and the switch and electrical connections are mounted in a stationary casing, and it has for object to improve the construction and working of such apparatus; to enable the casing to be readily maintained in a perfectly water tight condition; to render the internal parts of the apparatus readily accessible; to enable the fluctuations set up by the transmitter of one telephonic instrument to be reproduced with full effect in the receiver of another telephonic instrument, irrespective of the value of the inductance in the circuit, whether inherent therein or purposely inserted, so that objectionable extraneous fluctuations can be rendered practically inappreciable in the telephone apparatus; and to minimize the transmission of mechanical shocks to the apparatus from the support to which the same is attached. For these purposes the apparatus is constructed as will now be described with reference to the accompanying drawings wherein—

Figure 1:
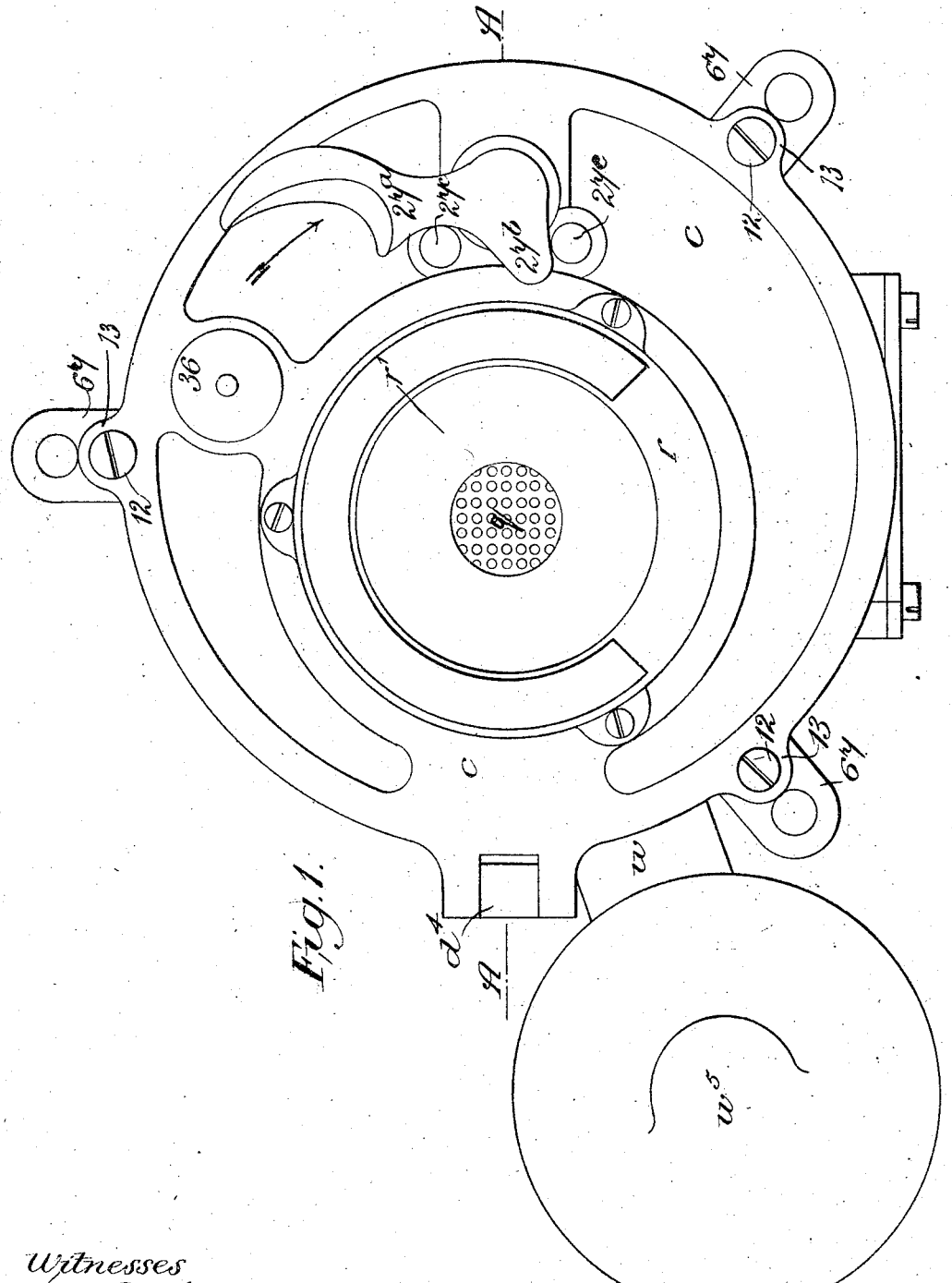
Figure 2:
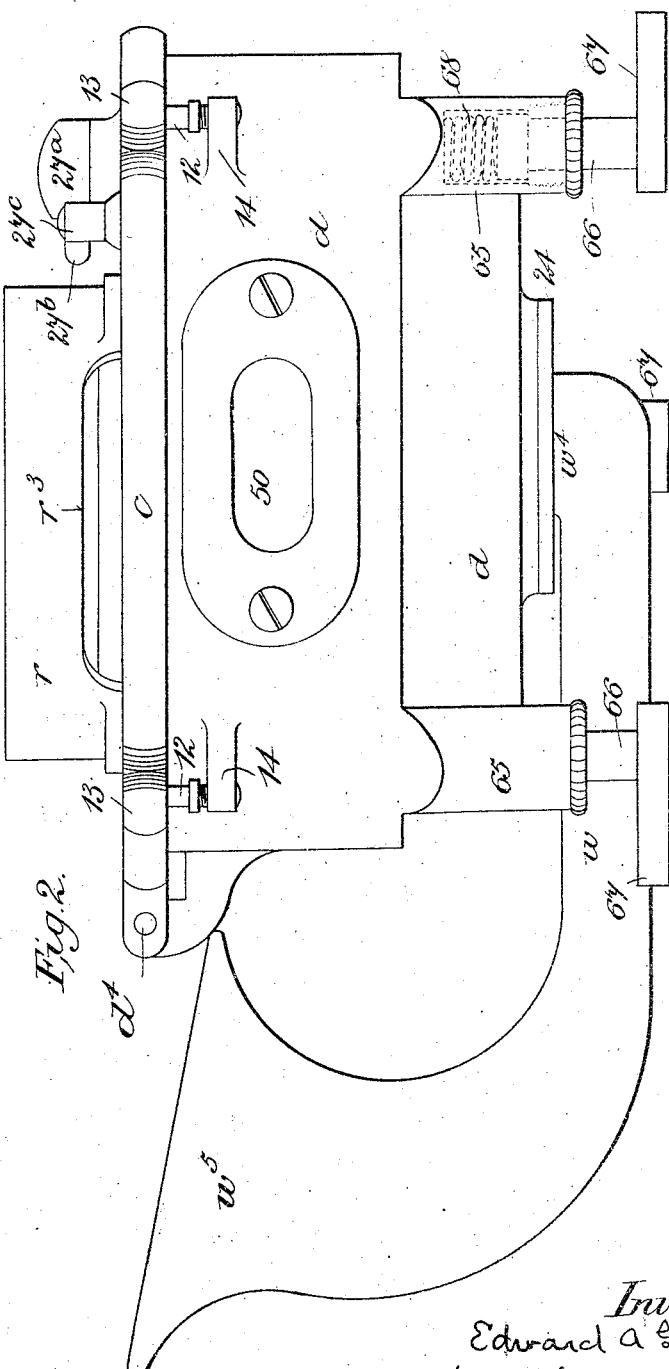
Figure 3:
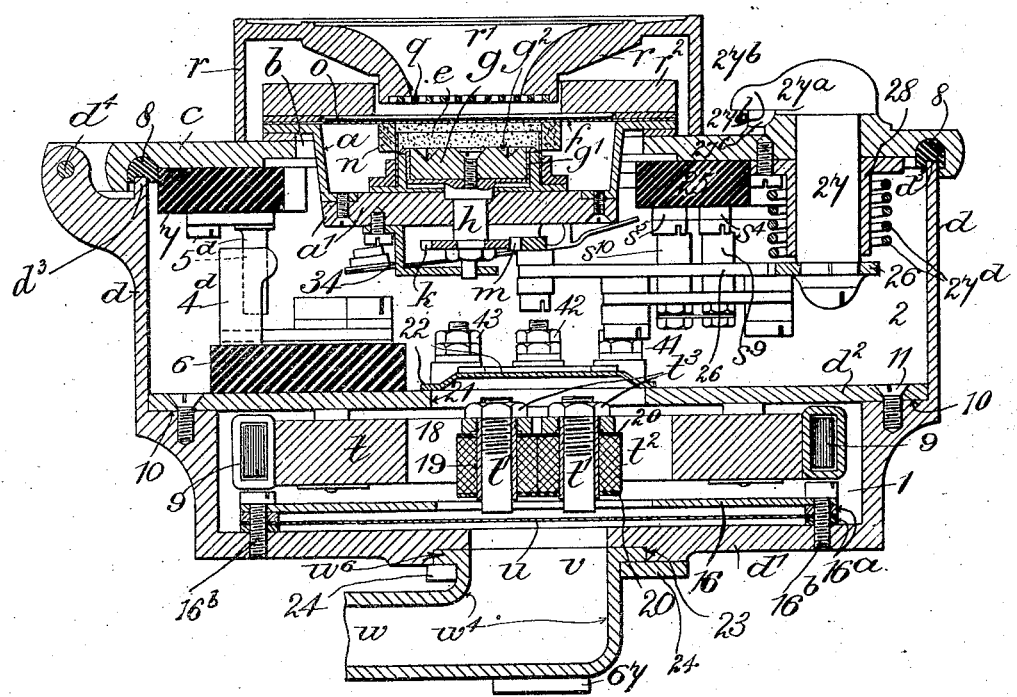
Figure 4:
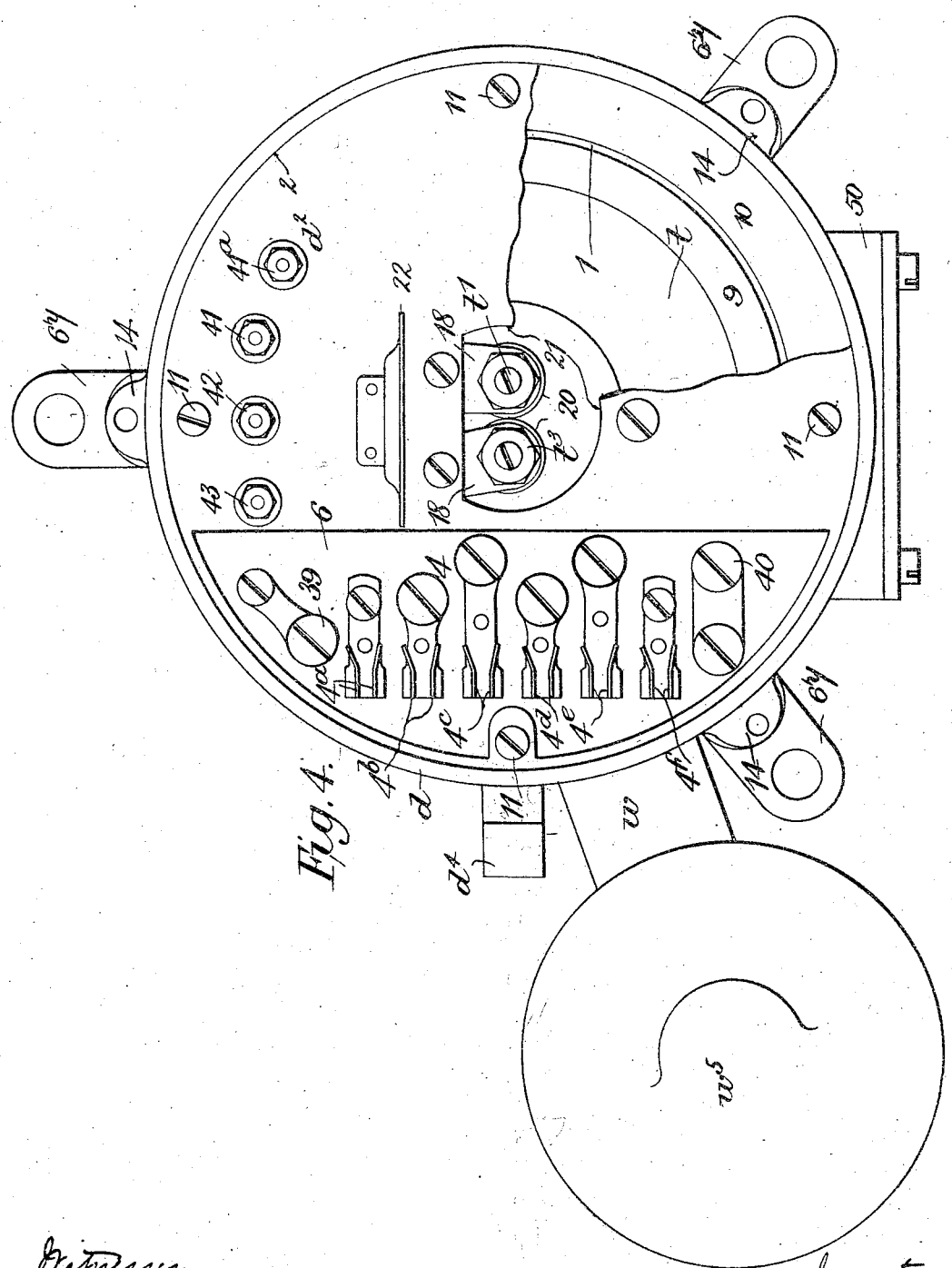
Figure 5:
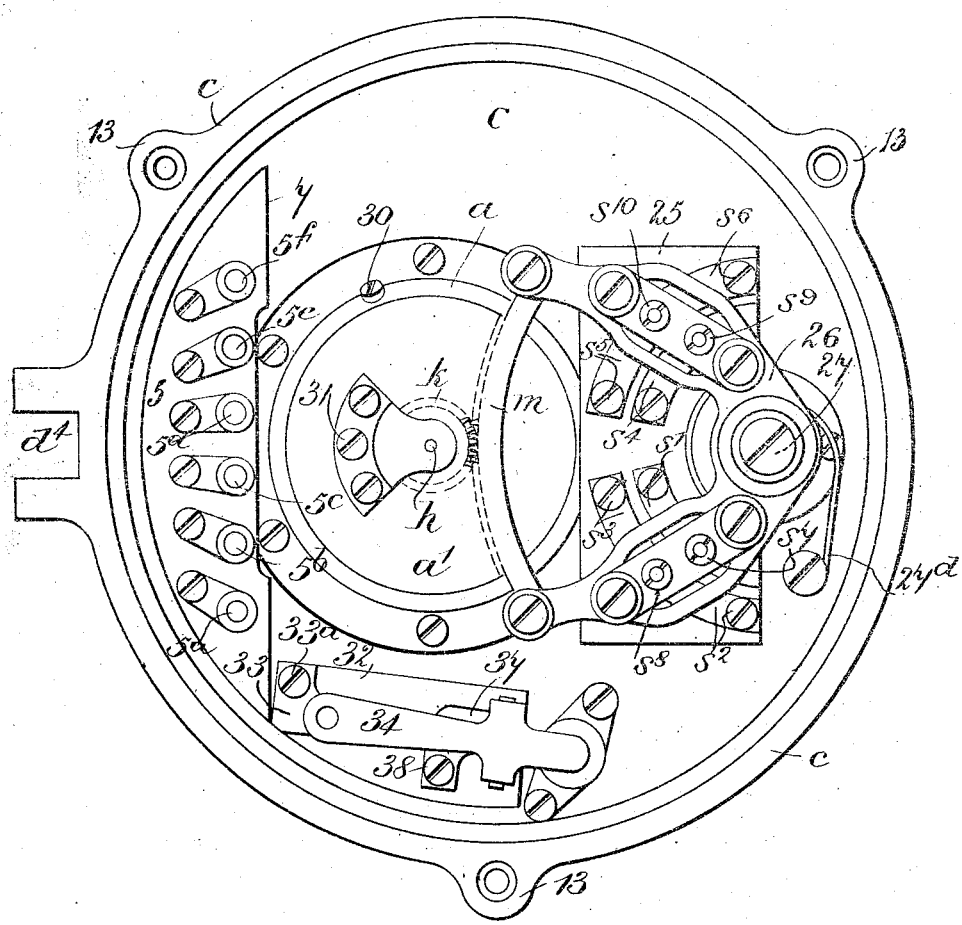
Figure 6:
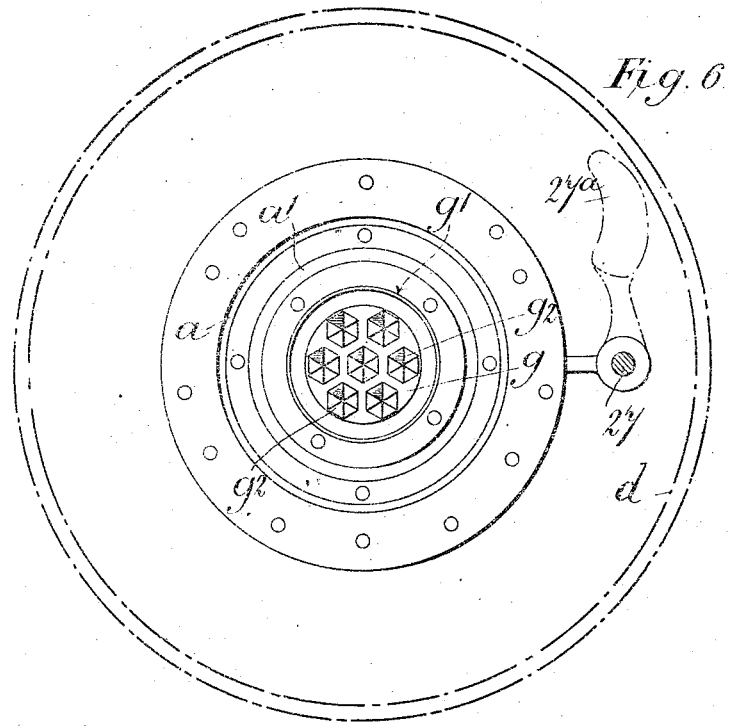
Figure 7:
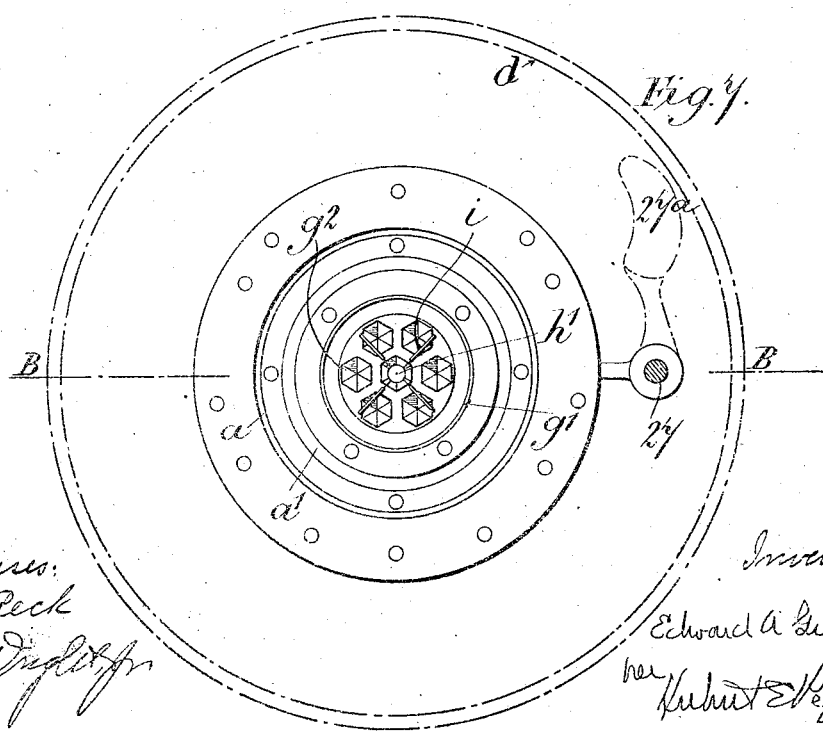

Figure 1 is a front view, Fig. 2 an underside view and Fig. 3 a horizontal section on the line A A of Fig. 1, as seen from below, showing one construction of telephonic apparatus embodying the invention. Fig. 4 is a front view of the apparatus with the cover removed and part broken away. Fig. 5 is an inverted rear view of the cover with the parts carried thereby. Fig. 6 is a face view of a rotary carbon electrode forming part of the transmitter. Fig. 7 is a face view and Fig. 8 a horizontal cross section on the line B B of Fig. 7, showing a modified construction of transmitter. Fig. 9 is a horizontal section showing a further modified construction of transmitter. Fig. 10 shows in rear elevation, and Fig. 11 in section on the line C C of Fig. 10, part of the telephonic receiver detached from the apparatus. Figs. 12 and 13 are respectively front and side elevations and Fig. 14 a vertical section on the line D D of Fig. 12, showing a modified construction of the apparatus. Fig. 15 is a diagram showing how two of the telephonic instruments can be connected up for use. Fig. 16 is a diagram showing a modified arrangement of the electrical connections.

In telephonic apparatus of the kind referred to, it has been usual to employ a transmitter of the microphone or carbon granule type and to mount the holder or case carrying such transmitter on the inner side of the stationary front cover of the casing, and to provide means whereby the holder and transmitter can be rotated from time to time in order to shake up the carbon granules therein and thereby maintain the transmitter in good working order. This arrangement however has rendered it necessary to form between the cover and holder, a movable joint which it has been found difficult in practice to keep perfectly water tight, so that when the apparatus is used on board ship and in other exposed positions, for which use the apparatus is more particularly designed, moisture is liable to enter the casing and affect the switch and other electrical connections therein and thus prevent the apparatus being maintained in good working condition for long intervals without attention.

Now according to the present invention in order to avoid this disadvantage, the holder $a$ containing a transmitter of the kind referred to is permanently fixed, as by screws, in or over an opening $b$ in the front cover $c$ of the telephonic casing $d$ so that a perfectly water tight joint is made between the two, and means are provided whereby the carbon granules $e$ in the transmitter can be agitated by movement of a body in direct contact therewith and arranged to be actuated from within the casing $d$ either automatically in the act of performing some other necessary telephonic function, or independently, as by a hand operated device capable of being actuated from the exterior of the casing. The granules $e$ may conveniently be confined, as shown, between the central portion of a stationary front insulated carbon electrode or diaphragm $f$ and a rotary rear carbon electrode $g$, or cup $g^1$, fixed to a spindle $h$ that extends through the rear wall $a^1$ of the holder $a$ and is provided with a wheel $k$ adapted to be rotated by a toothed segment $m$ capable of being operated from outside the casing $d$. The front face of the carbon block $g$, or the inner surface of the cup $g^1$, or each of these parts when both are movable, as in the example shown in Figs. 3 and 6, is or may be formed with pyramidal, conical or like recesses or projections $g^2$, or be otherwise so formed that when the block or cup, or block and cup, is or are rotated, the granules $e$ will be agitated. Or both the front and rear carbon electrodes $f$ and $g$ and cup $g^1$ may be fixed and the granules $e$ be moved by an agitating device embedded in them between such electrodes and adapted to be operated by means such as a spindle extending through the electrode $g$ and the rear wall $a^1$ of the holder $a$. The agitating device may in this case be a disk having projections of the kind referred to, or be otherwise adapted on one or both sides for the purpose mentioned. Or, as shown in Figs. 7 and 8, the device may consist of vanes $i$ of mica attached to a rotary spindle $h^1$. Or, as shown in Fig. 9, the granules $e$ may be agitated both by a rotary carbon electrode and cup $g$ $g^1$ and a rotary agitating device $i$ formed and arranged as described and adapted to be rotated in the same or opposite directions. In Fig. 9 the spindles $h$ and $h^1$ are concentric and the spindle $h$ is provided with a toothed wheel $k$ and the spindle $h^1$ with an internally toothed wheel $k^1$ into which gears a pinion $k^2$ that also gears into the toothed wheel $k$. The shaft $h^1$ is also provided with a toothed wheel $k^3$ adapted to be rotated by a toothed segment $m$ operation of which will turn the spindles and attached parts simultaneously in opposite directions.

The granules $e$ may be retained in place between the cup $g^1$ and diaphragm $f$ by soft packing material $n$, for example a ring of cotton, wool or the like. The rotary agitating portion or portions of the transmitter may conveniently be operated through gearing from the movable part of the switch used for opening the bell circuit and putting the receiver and transmitter in circuit and vice versa, as hereinafter described. The diaphragm $f$ is preferably covered by metal foil $o$, as usual, secured in a water tight manner, as by soldering at its outer periphery to the outer portion of the holder $a$. The diaphragm is preferably protected by a metal grating $q$ carried by a metal ring $r$ that is fixed to the cover $c$ and is preferably adapted to form, as shown, a mouthpiece $r^1$ to which the grating $q$ is fixed. $r^2$ is a ring fixed to the outer side of the holder $a$ so as to surround the mouthpiece $r^1$ and partly overlap the diaphragm $f$. The rings $r$ and $r^2$ are formed at their lower portions with openings $r^3$ (Fig. 2) for escape of any water that may enter the space between the diaphragm $f$ and grating $q$.

The permanent magnet $t$ of the telephone receiver is arranged in the rear end portion of the telephone casing $d$ with its diaphragm $u$ opposite a sound aperture, tube or passage $v$ which extends through the rear end wall $d^1$ of the casing and is in communication with a hearing tube or trumpet $w$. This tube or trumpet is preferably so mounted as to be capable of being turned about a horizontal axis to bring it into a convenient position for use. Sometimes, as in the example shown in Figs. 12, 13 and 14, the said sound aperture, tube or passage $v$ is in communication with two normally depending movable hearing tubes $w^1$, $w^2$ having ear pieces $w^3$ of known kind. The metal casing $d$ is preferably divided by a wall or partition $d^2$ into two separate compartments, namely a rear compartment 1 in which the telephonic receiver is placed, and a front compartment 2 in which the telephonic transmitter, switch and various electrical connections are arranged. The switch is preferably mounted on the inner side of the cover $c$ which is either hinged to or completely detachable from the casing so as to enable ready access to be gained to the interior thereof for inspecting the various parts therein.

The various electrical connections between the transmitter, receiver, line wires and telephonic bell, are preferably made through two sets of contacts, viz. a fixed set indicated collectively at 4 in Fig. 4, and a movable set, indicated collectively at 5 in Fig. 5, the fixed set 4 of contacts being secured to a stationary insulating support 6 in the front chamber 2, and the movable set 5 being secured to an insulating support 7 attached to the inner side of the cover $c$. The two sets of contacts are so arranged that they will automatically make proper connection with each other when the cover $c$ is secured to the casing $d$, and will readily become detached from each other, without injury, when the cover is opened. By this means, ready access can be gained to all parts of the apparatus when the cover $c$ is turned back or removed.

To enable the casing $d$ to be readily closed in a water tight manner, the cover $c$ is provided on its inner side with a packing ring 8 of india rubber or equivalent material in which the front edge $d^3$ of the casing will be embedded when the cover is secured in place.

In order that the fluctuations set up by the transmitter of one telephonic instrument may be reproduced in the receiver of another telephonic instrument with full effect, irrespective of the value of the inductance in the circuit, whether inherent therein or purposely inserted, so that objectionable extraneous fluctuations can be rendered practically inappreciable in the telephonic apparatus, especially in cases where the telephonic apparatus is worked from electric supply mains fed from a dynamo-electric machine, a resistance 9 (Figs. 3, 4 and 15), or resistances, of a non-inductive or substantially non-inductive character, is or are connected by the telephone switch, as hereinafter more fully described, in parallel with the circuit, or portion of a circuit, which includes the transmitter of one telephonic instrument and the receiver of another telephonic instrument in such a manner that a transmitter and receiver circuit is established which excludes the inductance and in which fluctuations, or certain of the fluctuations occasioned by the telephonic instrument, take place, or may take place, without necessarily traversing the inductance containing portion of the circuit.

To prevent or minimize the transmission of shocks to the telephonic apparatus from the bulkhead or other support therefor, the casing $d$ of such apparatus may be supported or connected to such bulkhead or support in a more or less elastic or yielding manner.

The various portions of telephonic apparatus embodying the present invention can be constructed in various forms.

In the constructional form shown in Figs. 1 to 6 inclusive, the casing $d$ is of cylindrical shape, the front portion thereof being of larger diameter than the rear portion so as to form between them an internal annular shoulder 10 against which the partition $d^2$ which forms a cover for the rear compartment 1, is detachably fixed, as by screws 11. The cover $c$ is hinged at one side to the casing $d$ at $d^4$ so that it can be freely turned outward to one side thereof, and is adapted to be securely fixed in the closed position to the casing, as by screws 12 passing through lugs 13 formed on it and engaging lugs 14 on the casing.

The telephone transmitter $e f g$ is constructed with an agitating device, and its holder $a$ is fixed to the cover $c$, as hereinbefore described.

The telephonic receiver (Figs. 3, 4, 10 and 11) comprises the diaphragm $u$ and a curved powerful permanent magnet $t$ having polar projections $t^1$ that are arranged at right angles to and opposite the central portion of the diaphragm $u$ and around which are the receiver coils $t^2$, as heretofore usual. In order however to avoid the transmission of strains to the diaphragm when the said magnet $t$ is fixed in place, the diaphragm holder 16 and magnet $t$ are arranged independently of each other, the diaphragm holder being fixed to the rear wall $d^1$ of the casing $d$ opposite the centrally arranged sound aperture $v$ therethrough, and the magnet $t$ being fixed to the inner side of the removable front cover $d^2$ of the rear compartment 1.

To enable the pole pieces $t^1$ to be readily adjusted in relation to the diaphragm $u$, so as to enable the best telephone effects to be obtained, they are preferably made separately adjustable in an endwise direction in relation to the magnet so that each of them can be easily and quickly adjusted toward or from the diaphragm to cause it to assume the proper position to obtain the best results. In the arrangement shown for this purpose, the permanent magnet $t$ is made of flat annular shape with a radial slit 17 therethrough at one part. To the free ends of the ring are fixed two pieces of soft iron 18 that extend inwardly toward the center of the magnet and form polar extensions of the magnet. To the free end of each of these polar extensions 18, and at right angles thereto, is fixed the flanged end of a short soft iron tube 19. This tube is provided at its ends with rings or collars 20 of non-magnetic material, for example brass or vulcanized fiber, so as to form a spool for carrying one of the receiver coils $t^2$. Each tube 19 is screw threaded internally and provided with a screw threaded pin or polar projection $t^1$ of soft iron one end of which is adapted, as by forming it with a notch, to admit of its being readily rotated, as by a screw driver, to cause it to move endwise in the tube. By this arrangement, after the permanent magnet $t$ with attached parts has been rigidly fixed in place, each pin $t^1$ can be easily and quickly adjusted in an endwise direction in the tube 19 toward or from the diaphragm $u$, to cause it to assume the proper position in which it can be then fixed, as by a locknut $t^3$. To enable ready access to be gained to the adjustable pole pieces $t^1$, the cover $d^2$ may be formed with an aperture 21 normally closed by a hinged or detachable cover plate 22. The diaphragm $u$ may conveniently be held at its periphery between rings $16^a$ of india rubber or like material clamped between the rear wall $d^1$ of the casing $d$ and an annular metal holder 16 secured thereto by screws $16^b$.

Over the sound exit aperture $v$ is secured the bent inner end $w^4$ of a radially arranged speaking tube $w$ that is capable of being turned about a horizontal axis and the outer end $w^5$ of which is of flared or trumpet shape and arranged to extend in a forward direction. The end $w^4$ of the said tube may conveniently be jointed to the casing $d$ by forming it with an outwardly extending flange $w^6$ that is held in a socket 23 in the rear wall $d^1$ of the casing by part of a slotted ring 24 that is fixed to the said rear wall and overlaps the flange so as to allow of the tube being turned to bring the speaking trumpet $w^5$ into any convenient position for use.

The switch for putting the bell out of circuit and the transmitter and receiver in circuit and vice versa, comprises according to the construction shown in Fig. 5, six fixed contacts $s^1$, $s^2$, $s^3$, $s^4$, $s^5$ and $s^6$, which are fixed upon a base 25 of insulating material fixed to the inner side of the front cover $c$, and two pairs of movable contacts $s^7$, $s^8$ and $s^9$, $s^{10}$ which are carried by but insulated from a quadrant shaped frame 26. This frame works in a plane parallel to the cover $c$ and is fixed to a spindle 27 carried by a bearing 28 and extending in a practically watertight manner through the cover to the front side thereof where it is provided with a hand lever $27^a$ (Fig. 1) which has an extension $27^b$ arranged to work between two fixed stops $27^c$. The arrangement is such that the frame 26 can be partly rotated by the lever $27^a$ against the action of a spring, such as a coiled spring $27^d$ (Fig. 3) and is connected at one end to the cover $c$ or bearing 28 and at the other end to the frame 26 so as to cause the movable contacts $s^7$, $s^8$, $s^9$, $s^{10}$ to slide over the fixed contacts $s^1$, $s^2$, $s^3$, $s^4$, $s^5$ and $s^6$ in the reverse direction when the lever is released.

The fixed contacts may conveniently be made in the form of circular segments arranged concentrically to the switch spindle 27, contacts $s^1$ and $s^4$ being arranged in one circular arc of one radius and insulated from each other, and contacts $s^2$ and $s^3$, and $s^5$ and $s^6$ being arranged in another circular arc of a different radius and insulated from each other. The movable contacts $s^7$ and $s^8$ are arranged side by side and electrically connected together, contact $s^7$ being arranged to bear at all times upon contact $s^1$ and contact $s^8$ being arranged to normally bear upon contact $s^2$ but to slide over it and bear against contact $s^3$ when the switch spindle 27 is rotated against the action of the spring $27^d$. The movable contacts $s^9$ and $s^{10}$ are also arranged side by side and electrically connected, contact $s^9$ bearing at all times upon contact $s^4$, and contact $s^{10}$ normally bearing upon contact $s^5$ but arranged to slide over the same and bear against contact $s^6$ when the switch spindle 27 is moved against the action of the spring $27^d$. The electrical connections between the switch and the transmitter, receiver, line wires and bell comprise, according to the arrangement shown in Figs. 4, 5 and 15, a set of insulated movable contacts $5^a$, $5^b$, $5^c$, $5^d$, $5^e$ and $5^f$ in the form of pins, and a set of corresponding insulated fixed contacts $4^a$, $4^b$, $4^c$, $4^d$, $4^e$ and $4^f$ in the form of pairs of spring blades between which the contact pins will pass and against which they will bear when the cover $c$ is closed. To the rear side of the cover $c$ are fixed two insulated terminals 30 and 31 that are connected to the stationary and rotary electrodes $f$ and $g$ respectively of the transmitter. Also to the rear side of the cover $c$ is fixed a block 32 of insulating material upon which are carried the fixed and movable members 33 and 34 respectively of a bell switch adapted to be closed against the action of a spring by a push 36 arranged to be operated from the front of the apparatus. The movable switch member 34 may conveniently be a lever arranged to be operated by the push 36 and carried by a metal support 37 having a terminal 38. The fixed switch member 33 has a terminal $33^a$. To prevent or minimize arcing, the two members 33—34 of the bell switch are normally at a considerable distance apart, say about three eighths of an inch, and to enable their contact surfaces to be readily renewed, they are preferably made of plugs of carbon. Upon the insulating block 6 are also fixed two terminals 39 and 40, and upon the front side of the cover $d^2$ but insulated therefrom, are fixed four terminals 41, $41^a$, 42 and 43 whereof 41 and 42 are connected (see Fig. 15) to the two ends of the connected coils $t^2$ of the telephonic receiver. The terminals 41 and $41^a$ are, in ordinary use, connected as shown. The terminals 41 and 43 are connected to the two ends of the non-inductive resistance 9. The various contacts and terminals are connected up as follows (see Fig. 15). Contact $s^1$ is connected to contact $5^c$; contact $s^2$ to bell terminal 38; contact $s^3$ to contact $5^a$ and transmitter terminal 30; contact $s^4$ to contact $5^f$; contact $s^5$ to contact $5^e$; contact $s^6$ to contact $5^f$; contact $5^c$ to the transmitter terminal 31 and bell terminal $33^a$; contact $4^f$ to the receiver terminal 42, and contact 39 to terminal 41. Contacts $4^b$, $4^c$, $4^d$ and 39 are connected respectively to separate insulated conductors 44, 45, 46 and 47, and contact $4^e$ to a conductor 48. Contact 39 is also connected to another conductor 49. The several conductors are led, in the form of a cable, and in a water-tight manner, through a gland 50 (Fig. 2) in the lower side of the front chamber 2. The conductors 44, 45, 46 and 47 are connected through a fuse and terminal box, or through a switch board at a central station, to another telephonic instrument at a distance and to an electric generator or generators, and conductors 48 and 49 are connected to the telephone bell B in an ordinary manner.

In the example diagrammatically shown in Fig. 15, the two conductors 44 of two telephonic instruments T and $T^1$ constructed as described are each connected to a positive terminal 51 in a fuse and terminal box 52, the said terminal being connected through a line coil 53, terminal $53^a$, fuse 54 and terminal 55 to the positive terminal of an electric generator 56. The conductor 45 from the instrument T and the conductor 46 from the instrument $T^1$ are connected to a common terminal 57. The conductor 46 from the instrument T and the conductor 45 from the instrument $T^1$ are connected to a common terminal 58, and the conductors 47 from both instruments are connected to a negative terminal 59 which is connected to the negative pole of the electric generator 56. The arrangement is such that when the cover $c$ of each instrument is closed and the switch is in its normal position, the telephonic transmitter and receiver are out of circuit but the bell of either instrument can be rung up from the other station. For example, if the push 36 of instrument $T^1$ be operated to ring up the bell B of instrument T, the circuit will be from positive terminal 51 through the parts 44, $4^b$, $5^b$, $s^1$, $s^7$, $s^8$, $s^2$, 38, 34, $33^a$, 31, $5^c$, $4^c$ and 45 of instrument $T^1$ to terminal 58, then through the parts 46, $4^d$, $5^d$, $s^4$, $s^9$, $s^{10}$, $s^5$, $5^e$, $4^e$, bell B, 49, 39 and 47 of instrument T to the negative terminal 59. When the switches of the two instruments are operated by their hand levers $27^a$ to speak, the two bells will be cut out of circuit and the transmitter of each instrument put in circuit with the receiver of the other instrument. The circuit of the transmitter of instrument $T^1$ and the receiver of instrument T is as follows:—from positive terminal 51 through the parts 44, $4^b$, $5^b$, $s^1$, $s^7$, $s^8$, $s^3$, transmitter $f$, $g$, 31, $5^c$, $4^c$ and conductor 45 of instrument $T^1$ to terminal 58, thence by the parts 46, $4^d$, $5^d$, $s^4$, $s^9$, $e^{10}$, $s^6$, $5^f$, $4^f$, 42, receiver $t^2$, 41, 39, and 47 of instrument T to the negative terminal 59. The circuit of the transmitter of instrument T and the receiver of instrument $T^1$ is as follows:—from positive terminal 51 through the parts 44, $4^b$, $5^b$, $s^1$, $s^7$, $s^8$, $s^3$, 30, transmitter $f$, $g$, 31, $5^c$, $4^c$, 45 of instrument T to terminal 57, then by the parts 46, $4^d$, $5^d$, $s^4$, $s^9$, $s^{10}$, $s^6$, $5^f$, $4^f$, 42, receiver $t^2$, 41, 39 and 47 to the negative terminal 59. The end of the resistance 9 in each instrument is at the same time connected through the parts 43, $4^a$, $5^a$ to $s^3$ and consequently to the positive terminal 51, while the other end of the said resistance is connected through the parts $41^a$ and 41 to 39 and consequently to the negative terminal 59, for the purpose hereinbefore described.

The electrical connections of the telephonic instrument can be varied to suit different requirements. Thus Fig. 16 shows an arrangement in which the left hand telephonic instrument T, which may be for use at a central station, is adapted to ring up and speak to a second instrument $T^1$ at an outstation the telephonic receiver of which is in circuit and will reproduce speech without operating the switch of such instrument, and a person at the outstation can speak to the central station when the switch at that station has been operated but cannot ring up such station. In this case contacts $4^e$ and $5^e$ of Fig. 15 are omitted in the central station instrument T and their position occupied by the contacts $4^a$, $5^a$; the parts $s^4$, $s^5$, $s^6$, $s^9$ and $s^{10}$ of the switch are also omitted, and the bell switch lever 34 normally bears against a contact $34^a$ that is connected to contact $5^c$. In the out-station instrument $T^1$, contacts $5^d$, $4^f$ and $5^f$ of Fig. 15 are omitted. Also, in both instruments the connections between the several parts are slightly modified as shown. The operation in this case is as follows:—Upon pressing the push 36 of instrument T to ring bell B of instrument $T^1$, current will flow from positive terminal 51 through the parts 44, $4^b$, $5^b$, 33, 34, 38, $5^d$, $4^d$ and 46 of instrument T to terminal 58 and thence through the parts 45, $4^c$, $5^c$, $s^4$, $s^9$, $s^{10}$, $s^5$, $5^e$, $4^e$, 48, bell B, 49, 39 and 47 to the negative terminal 59. The operator at station T can, after operating his switch, speak to instrument $T^1$ through the following circuit; from positive terminal 51 through the parts 44, $4^b$, $5^b$, $s^1$, $s^7$, $s^8$, $s^3$, 30, transmitter $f$, $g$, 31, $5^c$, $4^c$, and 45 of instrument T to terminal 57 and thence through the parts 46, $4^d$, 42, receiver coil $t^2$, 41, 39 and 47 to the negative terminal 59. The operator at station $T^1$ can, after operating his switch, speak to instrument T through the following circuit:—from positive terminal 51 through the parts 44, $4^b$, $5^b$, $S^1$, $S^7$, $S^8$, $S^3$, 30, transmitter $f$, $g$, 31, $s^6$, $s^{10}$, $s^9$, $s^4$, $5^c$, $4^c$ and 45 of instrument $T^1$ to terminal 58 and from thence through the parts 46, $4^d$, $5^d$, 38, 34, $34^a$, $5^f$, $4^f$, 42, receiver coil $t^2$, 41, 39 and 47 of instrument T to negative terminal 59.

The switch frame 26 may, as shown, carry the toothed segment $m$ that is in gear with the toothed wheel $k$ fixed to the spindle $h$ of the rotary electrode $g$ or equivalent agitating device of the transmitter, so that each time the said switch frame is operated, the said electrode, or equivalent, will be rotated and the carbon granules $e$ of the transmitter agitated. The non-inductive resistance device 9 may, when used for the purpose hereinbefore mentioned, conveniently be fixed in the rear chamber 1, of the casing $d$, as for example to the rear side of the cover plate $d^2$ thereof, and around the permanent magnet $t$, and has its two ends connected to terminals 41 and 43 as a shunt resistance. By this means such resistance is caused to serve a further useful purpose, inasmuch as when in use, heat generated therein will warm the air within the rear chamber 1, and thereby prevent the receiver diaphragm $u$ being subject to stress or strain when in use in cold climates.

In the modified construction shown in Figs. 12, 13 and 14, the sound aperture $v$ in the rear end wall $d^1$ is connected to a transverse sound passage $w^8$ to the opposite end of which are attached tubular fittings $w^9$ that can turn about an axis corresponding to the line $D^1$ $D^1$ of Fig. 12, and to which the two depending hearing tubes $w^1$, $w^2$ with ear pieces $w^3$ are articulated, the arrangement being such that the said tubes can be freely rotated around the axis of the said fittings so as to avoid any possibility of the instrument being injured by such rotation. In this case, the switch frame 26 is provided with a laterally extending lever arm engaged by the forked end $61^a$ of a lever 61 pivoted at 61$^b$ and the other forked end 61$^c$ of which is engaged by an eccentrically arranged pin 62 on the close inner end of the corresponding tubular fitting $w^9$, so that each time the corresponding hearing tube $w^2$ is raised into position for use, the lever 61 will operate the switch frame 26 and attached parts, and the segment thereon will operate the rotating carbon electrode $g$ of the transmitter, as and for the purposes hereinbefore described.

To minimize the transmission of shocks to the telephonic instrument from its support, the rear end wall $d^1$ of the casing $d$ may be formed with hollow lugs 65 in which are fitted supporting pins 66 adapted, as by lugs 67, to be fixed to the said support, a coiled spring 68 being interposed between the inner end of each pin and the casing for the purpose mentioned.

The details of construction can be variously modified.

What I claim is:—

1. Telephonic apparatus comprising a stationary casing having a water tight door and containing a transmitter of the carbon granule type, a receiver, and a switch adapted to control the circuits of said transmitter and receiver and of being operated from the exterior of the casing, a holder rigidly fixed in a water tight manner in an opening in said door and in which said transmitter is fixed, said transmitter having a movable part constituting an agitating device in contact with the carbon granules in said transmitter, an operating device connected to said movable part of the transmitter and extending into said casing and means whereby said operating device and agitating device can be operated from the exterior of the casing.

2. Telephonic apparatus comprising a stationary casing having a water tight door and containing a transmitter of the carbon granule type, a receiver, a switch adapted to control the circuits of said transmitter and receiver and to be operated from the exterior of the casing, a holder rigidly fixed in a water tight manner in an opening in said door and in which said transmitter is fixed, said transmitter having a part adapted to form a rotary granule agitating device in contact with the carbon granules in said transmitter and extending into said casing, means located within said casing for rotating said agitating device and means whereby the said rotating means can be operated from the exterior of the casing.

3. Telephonic apparatus comprising a stationary casing having a water tight door and containing a transmitter of the carbon granule type, a receiver, a switch adapted to control the circuits of said transmitter and receiver and to be operated from the exterior of the casing, a holder rigidly fixed in a water tight manner in an opening in said door and in which said transmitter is fixed, said transmitter having a movable part constituting an agitating device in contact with the carbon granules in said transmitter and provided with an operating device extending into said casing and means for operating said agitating device from said switch.

4. Telephonic apparatus comprising a stationary casing having a water tight door and containing a transmitter of the carbon granule type, a receiver, a switch for controlling the circuits of said transmitter and receiver, said switch being adapted to be operated from the exterior of the casing, a holder rigidly fixed in a water tight manner in an opening in said door and in which said transmitter is fixed, said transmitter comprising a stationary front carbon electrode, a movable rear carbon electrode and carbon granules confined between the rear electrodes and the central portion of the front electrode, a spindle fixed to said rear electrode and means extending within said casing whereby said spindle and rear electrode can be rotated from the exterior thereof.

5. Telephonic apparatus comprising a stationary casing having a water tight door and containing a transmitter of the carbon granule type, a receiver, a switch for controlling the circuits of said transmitter and receiver, said switch being adapted to be operated from the exterior of the casing, a holder rigidly fixed in a water tight manner in an opening in said door and in which said transmitter is fixed, said transmitter comprising a stationary front carbon electrode, a movable rear carbon electrode and carbon granules confined between the rear electrode and the central portion of the front electrode, a spindle fixed to said rear electrode and means for operating said spindle and rear electrode from said switch.

6. Telephonic apparatus comprising a stationary casing having a water tight door and containing a transmitter of the carbon granule type, a receiver, a switch for controlling the circuits of said transmitter and receiver, said switch being mounted on said door and adapted to be operated from the exterior of the casing, a holder rigidly fixed in a water tight manner in an opening in said door and in which said transmitter is fixed, said transmitter having a movable part that is adapted to form an agitating device in contact with the carbon granules in said transmitter and is provided with an operating device extending into said casing and geared to a movable part of said switch.

7. Telephonic apparatus comprising a stationary casing having a water tight door and containing a transmitter of the carbon granule type, a receiver, a switch for controlling the circuits of said transmitter and receiver, said switch being adapted to be operated from the exterior of the casing, a holder rigidly fixed in a water tight manner in an opening in said door and in which said transmitter is fixed, said transmitter comprising a stationary front carbon electrode, a movable rear carbon electrode and carbon granules confined between the rear electrode and the central portion of the front electrode, a spindle fixed to said rear electrode for rotating the rear carbon and agitating the carbon granules, a second carbon granule agitating device embedded in the granules and connected to a spindle extending through the rear carbon and its spindle and gearing for rotating said agitating devices in opposite directions from said switch.

8. Telephonic apparatus comprising a casing, a removable partition dividing the same into separate transmitter and receiver compartments, a water tight cover for the transmitter compartment, a holder rigidly fixed to and extending through said cover, a microphone transmitter carried by said holder and having a part thereof adapted to form a granule agitating device extending from the transmitter into the transmitter compartment and means adapted to be operated from without the casing for controlling the action of the agitating device.

9. Telephonic apparatus comprising a casing, a removable partition dividing the same into separate transmitter and receiver compartments, a water tight cover for the transmitter compartment, a holder rigidly fixed to and extending through said cover, a microphone transmitter carried by said holder and having a part thereof adapted to form a granule agitating device extending from the transmitter into the transmitter compartment, means adapted to be operated from without the casing for controlling the action of the agitating device, a receiver located in the receiver compartment and a sound amplifier in communication with said receiver.

10. Telephonic apparatus comprising a casing, a water tight cover therefor, a holder fixed to and extending in a water tight manner through said cover, a transmitter within said holder, a removable partition dividing the said casing into a transmitter compartment and a separate receiver compartment, a receiver located in the receiver compartment and a sound trumpet communicating with said compartment, said sound trumpet being adjustable in a vertical plane about a horizontal axis extending from front to back of said apparatus.

11. Telephonic apparatus comprising a casing, a water tight cover therefor, a transmitter fixed to and extending through said cover, a removable partition dividing the said casing into a front compartment and a separate rear compartment, fixed and movable sets of contacts in the front chamber for establishing connection between the transmitter, receiver, line wires and telephonic bell, and a receiver in the rear compartment of the casing.

12. Telephonic apparatus comprising a casing, a removable water tight cover therefor, a transmitter of the carbon granule type fixed to and extending in a water tight manner through said cover, a removable partition dividing the said casing into a front compartment and a separate rear compartment, a set of contacts stationarily carried by the removable partition on the side adjacent to the front chamber and a co-acting set of contacts on the inner side of the cover arranged to automatically make connection with the other set when the cover is closed and become disengaged when the cover is opened.

13. Telephonic apparatus comprising a casing, a removable water tight cover therefor, a transmitter of the carbon granule type fixed to and extending in a water tight manner through said cover, a removable partition dividing the said casing into a front compartment and a separate rear compartment, a set of contacts stationarily carried by the removable partition on the side adjacent to the front chamber, a co-acting set of contacts on the inner side of the cover for engagement and disengagement with the other set, a receiver in the rear compartment, a central aperture in the partition to enable partial access to be gained to the receiver when the front compartment is opened and means for normally closing said aperture.

14. Telephonic apparatus comprising a casing, a removable partition dividing the same into separate transmitter and receiver compartments, a water tight cover for the transmitter compartment, a holder rigidly fixed to and extending through said cover, a microphone transmitter carried by said holder and having a part thereof adapted to form a granule agitating device extending from the transmitter into the transmitter compartment and means operated from without the casing for controlling the action of the agitating device.

15. Telephonic apparatus comprising a casing, a removable partition dividing the same into separate front transmitter and rear receiver compartments, a water tight cover for the transmitter compartment, a granular microphone transmitter extending partly through the said cover and having part thereof adapted to form a granule agitating device extending from the transmitter into the transmitter compartment, means for operating said agitating device from the exterior of said casing, a receiver located in the rear compartment and a sound trumpet communicating with the said rear compartment and adjustable in position with respect thereto.

16. Telephonic apparatus comprising a casing, a removable partition dividing the same into separate front transmitter and rear receiver compartments, a water tight cover for the transmitter compartment, a granular microphone transmitter extending partly through the said cover and having part thereof adapted to form a granule agitating device extending from the transmitter into the transmitter compartment, means for operating said agitating device from the exterior of said casing, fixed and movable sets of contacts in the front chamber for establishing connection between the transmitter, receiver, line wires and telephone bell, and a receiver in the rear compartment.

17. Telephonic apparatus comprising a casing, a removable partition dividing the same into separate front transmitter and rear receiver compartments, a water tight cover for the transmitter compartment, a granular microphone transmitter extending partly through the said cover and having part thereof adapted to form a granule agitating device extending from the transmitter into the transmitter compartment, means for operating said agitating device from the exterior of said casing, fixed and movable sets of contacts in the front chamber for establishing connection between the transmitter, receiver, line wires and telephone bell, a receiver in the rear compartment and a sound trumpet communicating with the rear compartment and adjustable with respect thereto about a horizontal axis.

18. Telephonic apparatus comprising a casing, a removable partition dividing the same into separate front transmitter and rear receiver compartments, a water tight cover for the transmitter compartment, a granular microphone transmitter extending partly through the said cover and having part thereof adapted to form a granule agitating device extending from the transmitter into the transmitter compartment, means for operating said agitating device from the exterior of said casing, a set of contacts stationarily carried by the removable partition on the side adjacent to the front chamber and a co-acting set of contacts on the inner side of the cover arranged to automatically make connection with the other set when the cover is closed and become disengaged when the cover is opened.

19. Telephonic apparatus comprising a casing, a removable partition dividing the same into separate front transmitter and rear receiver compartments, a water tight cover for the transmitter compartment, a granular microphone transmitter extending partly through the said cover and having part thereof adapted to form a granule agitating device extending from the transmitter into the transmitter compartment, means for operating said agitating device from the exterior of said casing, a set of contacts stationarily carried by the removable partition on the side adjacent to the front chamber, a co-acting set of contacts on the inner side of the cover arranged to automatically make connection with the other set when the cover is closed and become disengaged when the cover is opened, a receiver located in the rear compartment, and a sound trumpet communicating with the said compartment.

20. Telephonic apparatus comprising a casing, a removable partition dividing the same into separate front transmitter and rear receiver compartments, a water tight cover for the transmitter compartment, a granular microphone transmitter extending partly through the said cover and having part thereof adapted to form a granule agitating device extending from the transmitter into the transmitter compartment, means for operating said agitating device from the exterior of said casing, a set of contacts stationarily carried by the removable partition on the side adjacent to the front chamber, a co-acting set of contacts on the inner side of the cover for engagement and disengagement with the other set, a receiver in the rear compartment, a central aperture in the partition to enable partial access to be gained to the receiver when the front compartment is opened, and means for normally closing said aperture.

21. In telephonic apparatus, the combination with a casing, a water tight cover therefor and a removable partition dividing the casing into front and rear compartments, of a permanent magnet fixed to the rear side of the partition, a diaphragm holder fixed to the rear end wall of the rear compartment and hearing means in communication with such compartment.

22. In telephonic apparatus, the combination with a casing, a watertight cover therefor and a removable partition dividing the casing into front and rear compartments, of a permanent magnet fixed to the rear side of the partition, soft iron polar extensions extending toward the center of the magnet, an internally screw threaded soft iron tube carried by each of said extensions, an externally screw threaded polar projection of soft iron carried within each tube, receiver coils supported by said tubes, and a diaphragm secured to the wall of the rear compartment opposite the partition, said polar projections being capable, by rotation, of endwise adjustment toward or from the diaphragm.

23. In telephonic apparatus, the combination with a casing, a watertight cover therefor and a removable partition dividing the casing into front and rear compartments, of a permanent magnet fixed to the rear side of the partition, soft iron polar extensions extending toward the center of the magnet, an internally screw threaded soft iron tube carried by each of said extensions, an externally screw threaded polar projection of soft iron carried within each tube, receiver coils supported by said tubes, and a diaphragm secured to the wall of the rear compartment opposite the partition, said polar projections being capable, by rotation, of endwise adjustment toward or from the diaphragm, and hearing means in communication with the said rear compartment.

24. Telephonic apparatus comprising a casing of cylindrical form, a removable partition plate dividing the casing into front and rear compartments, a cover hinged to one end of the casing and formed with a central opening, packing and securing devices for closing the cover in a water-tight manner, a holder rigidly attached to the said cover in front of the opening therein, a stationary front carbon transmitter diaphragm and a revoluble rear carbon electrode in said holder, carbon granules confined between said diaphragm and rear electrode, a spindle extending through the rear of the holder, a telephone switch in the front compartment, a movable member therefor, means extending through the front cover for operating the switch member, means provided on the switch member for simultaneously rotating the spindle to which the movable transmitter electrode is attached, a permanent magnet fixed to the rear side of the removable partition, a diaphragm holder fixed to the rear end wall of the rear compartment and carrying the receiver diaphragm, and a trumpet mounted to revolve about a horizontal axis and having its inlet end opposite said receiver diaphragm.

25. Telephonic apparatus comprising a casing of cylindrical form, a removable partition plate dividing the casing into front and rear compartments, a cover hinged to one end of the casing and formed with a central opening, packing and securing devices for closing the cover in a water-tight manner, a holder rigidly attached to the said cover in front of the opening therein, a stationary front carbon transmitter diaphragm and a revoluble rear carbon electrode in said holder, carbon granules confined between said diaphragm and rear electrode, a spindle extending through the rear of the holder, a telephone switch in the front compartment, a movable member therefor, means extending through the front cover for operating the switch member, means provided on the switch member for simultaneously rotating the spindle to which the movable transmitter electrode is attached, a permanent magnet fixed to the rear side of the removable partition, soft iron polar extensions extending toward the center of the magnet, an internally screw threaded soft iron tube carried by each of said extensions, an externally screw threaded polar projection of soft iron carried within each tube, receiver coils supported by said tubes, and a diaphragm secured to the wall of the rear compartment opposite the partition, said polar projections being capable, by rotation, of endwise adjustment toward or from the diaphragm.

26. Telephonic apparatus comprising a casing of cylindrical form, a removable partition plate dividing the casing into front and rear compartments, a cover hinged to one end of the casing and formed with a central opening, packing and securing devices for closing the cover in a water-tight manner, a holder rigidly attached to the said cover in front of the opening therein, a stationary front carbon transmitter diaphragm and a revoluble rear carbon electrode in said holder, carbon granules confined between said diaphragm and rear electrode, a spindle extending through the rear of the holder, a telephone switch in the front compartment, a movable member therefor, means extending through the front cover for operating the switch member, means provided on the switch member for simultaneously rotating the spindle to which the movable transmitter electrode is attached, a permanent magnet fixed to the rear side of the removable partition, soft iron polar extensions extending toward the center of the magnet, an internally screw threaded soft iron tube carried by each of said extensions, an externally screw threaded polar projection of soft iron carried within each tube, receiver coils supported by said tubes, and a diaphragm secured to the wall of the rear compartment opposite the partition, said polar projections being capable, by rotation, of endwise adjustment toward or from the diaphragm, and a trumpet mounted to revolve about a horizontal axis and having its inlet end opposite the receiver diaphragm.

27. Telephonic apparatus comprising a casing of cylindrical form, a removable partition plate dividing the casing into front and rear compartments, a cover hinged to one end of the casing and formed with a central opening, packing and securing devices for closing the cover in a water-tight manner, a holder rigidly attached to the said cover in front of the opening therein, a stationary front carbon transmitter diaphragm and a revoluble rear carbon electrode in said holder, carbon granules confined between said diaphragm and rear electrode, a spindle extending through the rear of the holder, a telephone switch in the front compartment, a movable member therefor, means extending through the front cover for operating the switch member, means provided on the switch member for simultaneously rotating the spindle to which the movable transmitter electrode is attached, a set of contacts stationarily carried by the removable partition on the side adjacent to the front chambers and a co-acting set of contacts on the inner side of the cover arranged to automatically make connection with the other set when the cover is closed and become disengaged when the cover is opened.

28. Telephonic apparatus comprising a casing of cylindrical form, a removable partition plate dividing the casing into front and rear compartments, a cover hinged to one end of the casing and formed with a central opening, packing and securing devices for closing the cover in a water-tight manner, a holder rigidly attached to the said cover in front of the opening therein, a stationary front carbon transmitter diaphragm and a revoluble rear carbon electrode in said holder, carbon granules confined between said diaphragm and rear electrode, a spindle extending through the rear of the holder, a telephone switch in the front compartment, a movable member therefor, means extending through the front cover for operating the switch member, means provided on the switch member for simultaneously rotating the spindle to which the movable transmitter electrode is attached, a set of contacts stationarily carried by the removable partition on the side adjacent to the front chamber, a co-acting set of contacts on the inner side of the cover arranged to automatically make connection with the other set when the cover is closed and become disengaged when the cover is opened, a permanent magnet fixed to the rear side of the removable partition, a diaphragm holder with diaphragm fixed to the rear end wall of the rear compartment and a trumpet mounted to revolve about a horizontal axis and in communication with the said rear compartment opposite the latter diaphragm.

29. Telephonic apparatus comprising a casing, a watertight cover therefor, a transmitter extending through said cover, a removable partition dividing the said casing into a transmitter compartment and a separate receiver compartment, a receiver located in the receiver compartment, a set of line contacts in the transmitter compartment, a permanent magnet fixed to the removable partition and located in the receiver chamber, a diaphragm independently fixed to the opposite wall thereof, a non-inductive resistance located in the receiver compartment, terminals in the transmitter compartment to which the non-inductive resistance is joined and connection between the said terminals and the line contacts.

Signed at London England this 19th day of September 1907.

EDWARD ALFRED GRAHAM.

Witnesses:
T. L. RAND,
P. PHILLIPPS.